United States Patent [19]

Soderberg

[11] Patent Number: 4,750,989
[45] Date of Patent: Jun. 14, 1988

[54] CATALYST INVENTORY DETERMINATION

[75] Inventor: David J. Soderberg, Naperville, Ill.

[73] Assignee: Amoco Corporation, Chicago, Ill.

[21] Appl. No.: 3,743

[22] Filed: Jan. 16, 1987

[51] Int. Cl.⁴ .................. C10G 13/00; C10G 23/02
[52] U.S. Cl. .................. 208/143; 208/146; 208/157; 208/166; 208/DIG. 1; 422/219
[58] Field of Search .............. 208/143, 142, 146, 150, 208/152, 154, 157, DIG. 1; 422/211, 216, 219

[56] References Cited

U.S. PATENT DOCUMENTS

| | | | |
|---|---|---|---|
| 2,834,658 | 5/1958 | Lieffers et al. | 208/107 X |
| 2,987,465 | 6/1961 | Johanson | 208/146 X |
| 3,547,809 | 12/1970 | Ehrlich et al. | 208/157 X |
| 3,718,579 | 2/1973 | Uhl et al. | 208/146 X |
| 3,826,737 | 7/1974 | Pegels et al. | 208/166 X |
| 3,849,295 | 11/1974 | Addison | 208/150 X |
| 3,873,441 | 3/1975 | Jones | 208/166 |
| 4,059,502 | 11/1977 | James | 208/157 X |
| 4,502,946 | 3/1985 | Pronk | 422/219 X |

Primary Examiner—Helen M. S. Sneed
Assistant Examiner—Glenn Caldarola
Attorney, Agent, or Firm—Thomas W. Tolpin; William H. Magidson; Ralph H. Medhurst

[57] ABSTRACT

An effective, efficient and safe method is provided to accurately determine the amount of catalyst in an ebullated bed reactor without depressurizing the reactor or exposing the hydrocarbon in the reactors to oxidizing, flammable, or explosive conditions. Measurements are made automatically by density detectors and pressure sensors along with other equipment.

14 Claims, 5 Drawing Sheets

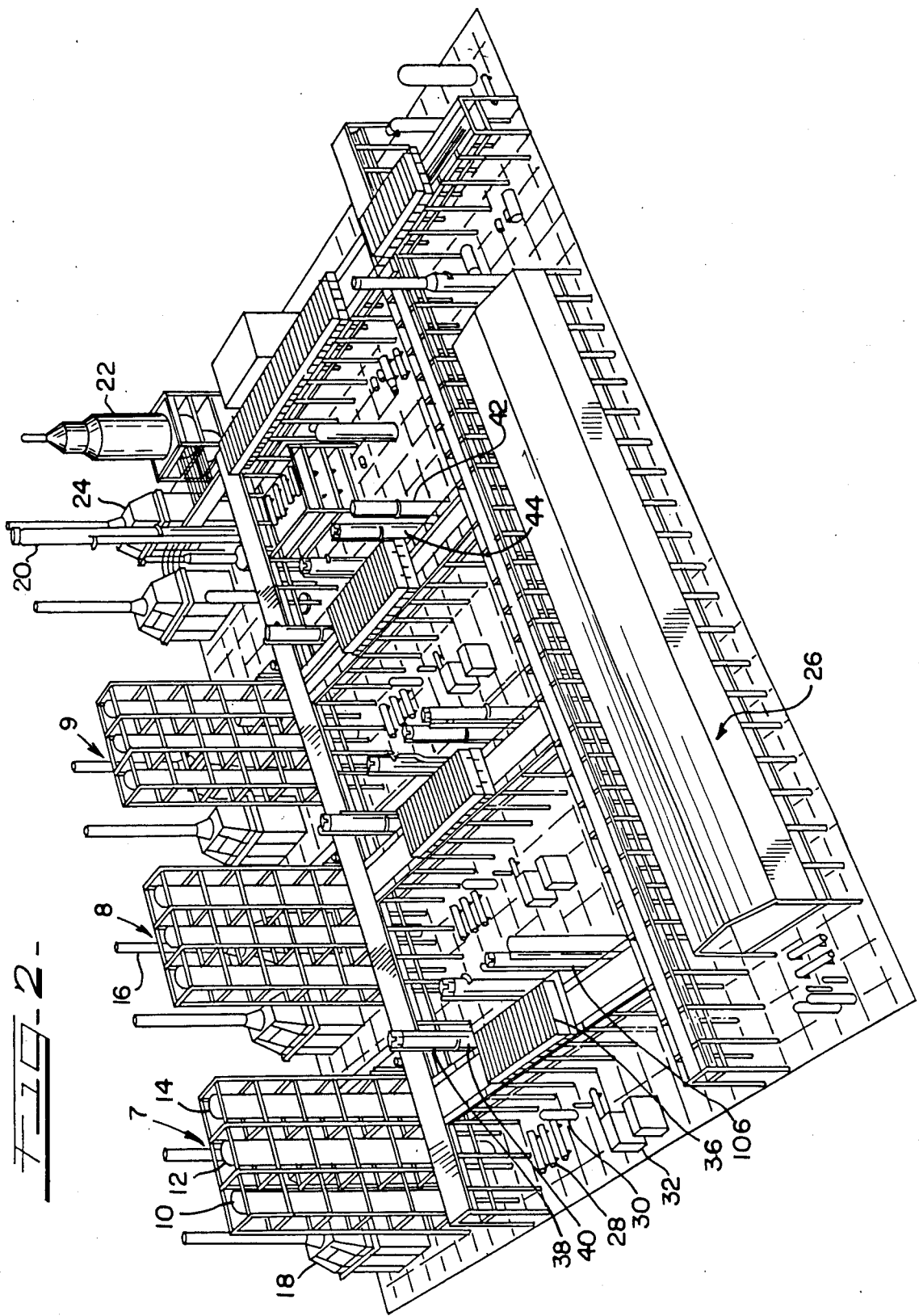

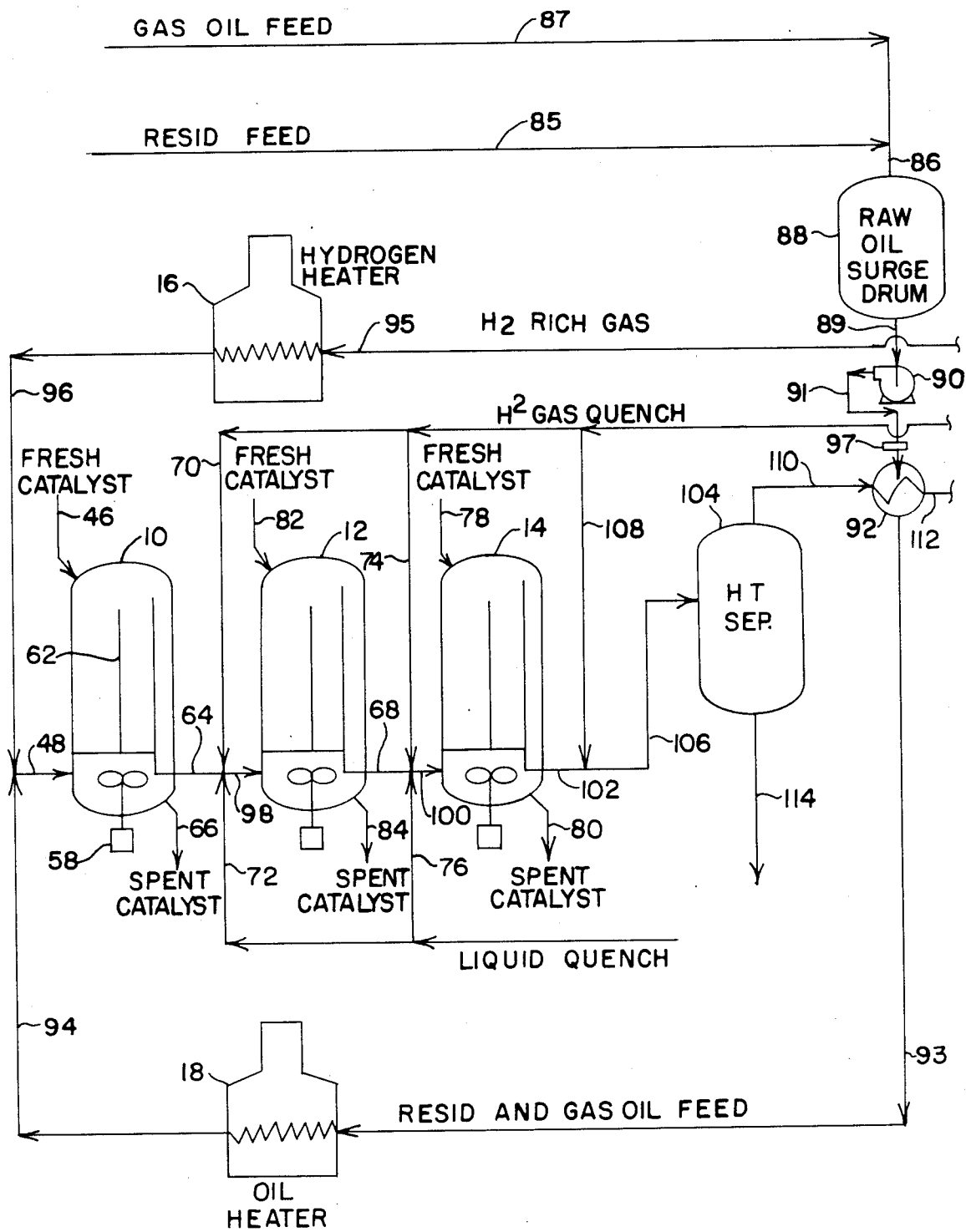

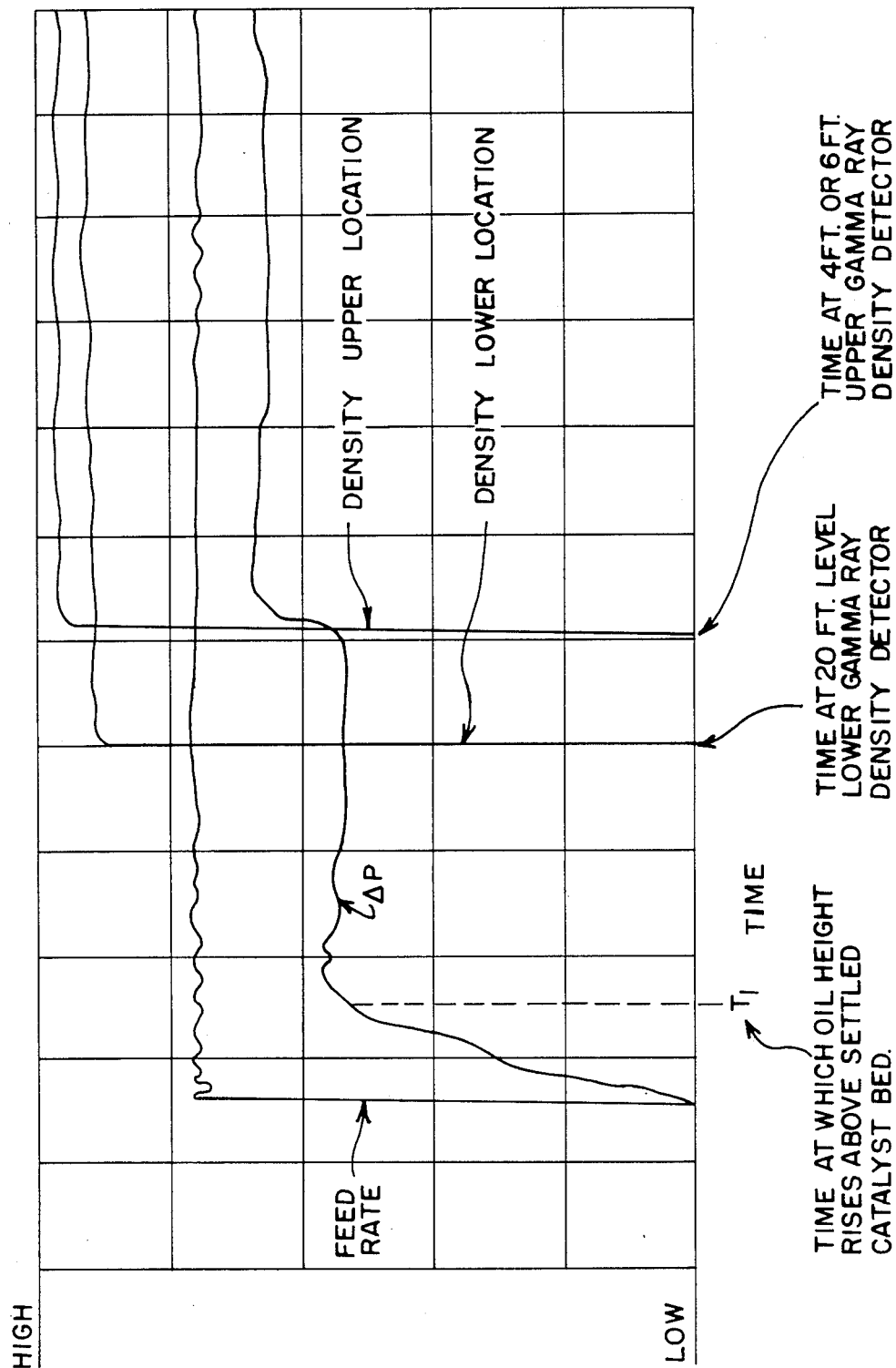

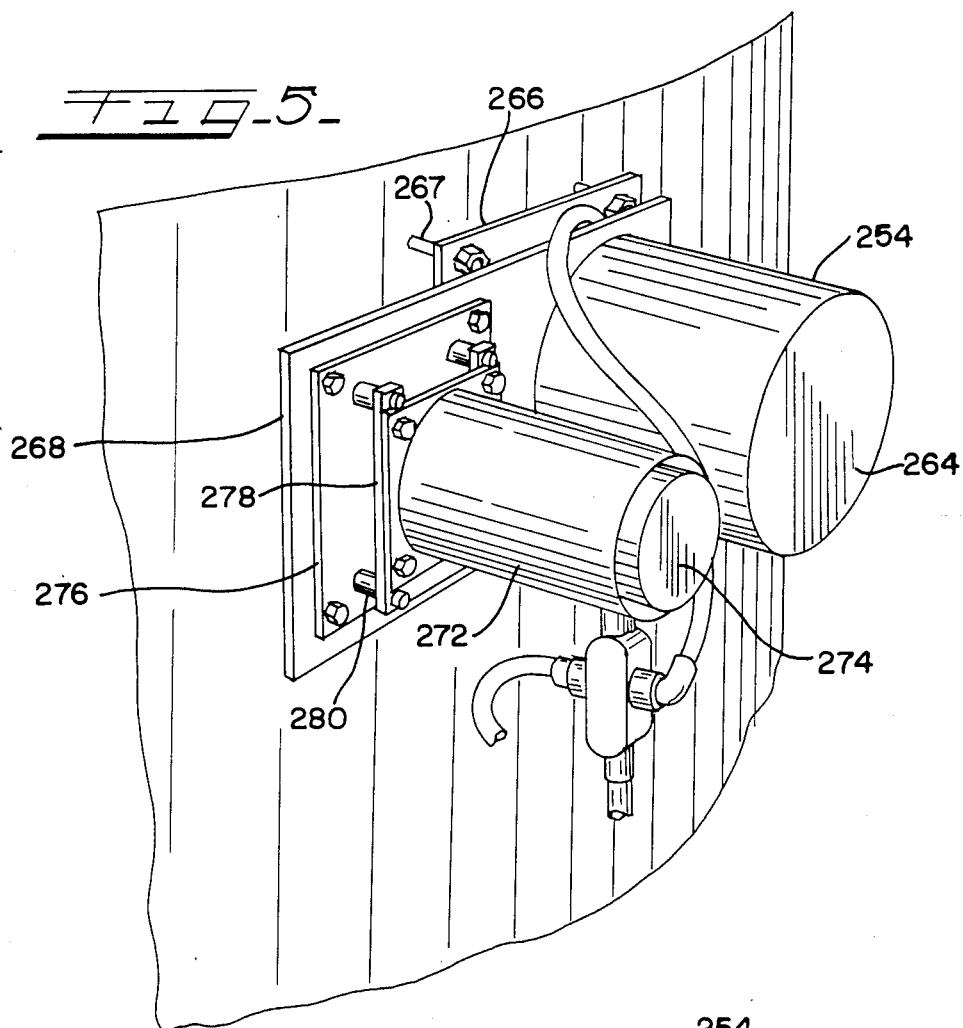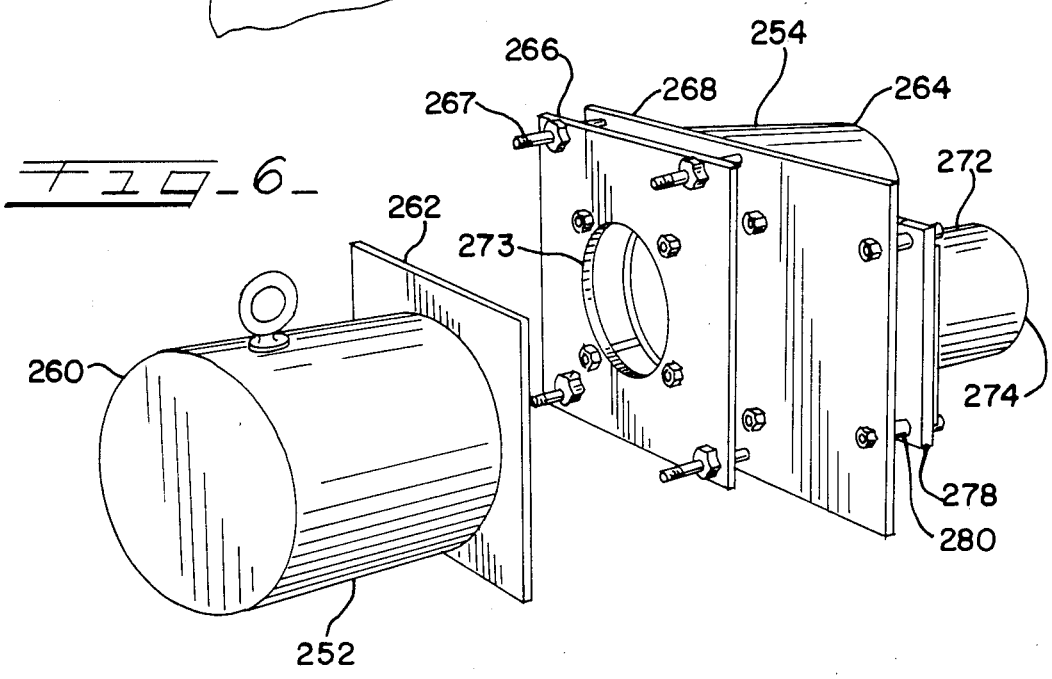

CATALYST INVENTORY DETERMINATION

BACKGROUND OF THE INVENTION

This invention relates to catalyst inventory measurements and, more particularly, to a process for determining the amount of catalyst in a resid hydrotreating unit in an oil refinery.

In the past, spiraling oil costs, extensive price fluctuations, and artificial output limitations by the cartel of oil producing countries (OPEC) have created instability and uncertainty for net oil consuming countries, such as the United States, to attain adequate supplies of high quality, low-sulfur, petroleum crude oil (sweet crude) from Saudi Arabia, Nigeria, Norway, and other countries at reasonable prices for conversion into gasoline, fuel oil, and petrochemical feedstocks. In an effort to stabilize the supply and availability of crude oil at reasonable prices, Amoco Oil Company has developed, constructed, and commercialized extensive, multimillion dollar refinery projects under the Second Crude Replacement Program (CRP II) to process poorer quality, high sulfur, petroleum crude oil (sour crude) and demetalate, desulfurize, and hydrocrack resid to produce high-value products, such as gasoline, distillates, catalytic cracker feed, metallurgical coke, and petrochemical feedstocks. The Crude Replacement Program is of great benefit to the oil-consuming nations by providing for the availability of adequate supplies of gasoline and other petroleum products at reasonable prices while protecting the downstream operations of refining companies.

The successful commercialization and use of ebullated bed reactors requires numerous tons of catalyst to be transported to and removed from the ebullated bed reactors daily. It is important to have accurate measurements of the catalyst inventory in the ebullated bed reactors since such measurements determine the amount of fresh catalyst to be added to the reactors and the amount of spent catalyst to be withdrawn from the reactors. It is also important to have an accurate measurement of the catalyst inventory to apply process models to the overall process to most efficiently operate the unit for maximum product yield and process economy. The amount of catalyst inventory is also essential to determine the space velocity, which is the ratio of oil flowrate to catalyst volume. Actual catalyst inventory determination with little or no error is required to accurately determine the amount of fresh catalyst replacement to most effectively and productively operate the reactors.

For example, if an extra 1% of fresh catalyst is added per day to the reactors, the reactors will be completely filled in a short period of time. If 1% less than the proper amount of catalyst is added per day to the reactors, the reactors will be completely empty of catalyst in 100 days, assuming an initial load of 100%.

Inadequate amounts of a catalyst can lead to excessive thermal cracking, increased catalyst coking (coke formation), excessive solids buildup, and plugging. This can lead to shutdown, extended downtime, increased frequency of repair, decreased efficiency, and reduced product quality.

Excessive catalyst inventory can produce packed beds and local hot spots. Packed bed reactors are also much more susceptible to plugging by any solids present. Too much catalyst occupies portions of the reactor volume needed to convert the oil feed to more valuable products. Excessive catalyst can also plug the pumps, lines, and reactor grids. Furthermore, excessive catalyst can lead to premature shutdown, extended downtime, and increased frequency of maintenance and repair. Increased maintenance and repair requires additional manpower and is time consuming, tedious, and expensive. Excessive catalyst inventory also diminishes the conversion of feed to more valuable lower-boiling liquid products. Excessive catalyst further decreases the reactors' efficiency and adversely affects the profitability of the unit.

One method which has been suggested to measure catalyst inventory is to insert a plumb line and bob (bobber) to measure the distance between the top of the catalyst bed and the top or upper tangent line of the reactor. The amount of catalyst can then be determined by calculating the empty space (volume) above the catalyst bed based upon the measured height and the known effective area of the reactor. The plumb and bob technique requires that the reactor be opened to insert the plumb and bob. Since the reactor is operated at high pressures in nonoxidative or inert conditions, this will cause the pressurized hydrocarbon contents of the reactor to flow out of the reactor to the surrounding air. This can rapidly lead to flammable limits and explosive conditions which can cause explosions, fire, and damage to the reactor and injury to surrounding personnel.

The plumb and bob technique can also be used after first depressurizing the reactor to minimize explosive conditions. Unfortunately, this leads to excessive downtime and decreased profitability of the unit. Depressurizing of the reactor will also cool the reactor as well as the oil feed which can cause dissolved hydrogen to degas from the metal walls and liners of the reactor which may cause substantial damage to the structural integrity of the liner.

It is, therefore, desirable to provide an improved process for determining the catalyst inventory in an ebullated bed reactor which overcomes most, if not all, of the preceding problems.

SUMMARY OF THE INVENTION

An improved process is provided to accurately measure catalyst inventory in an ebullated (expanded) bed reactor which is safe, efficient, and effective. Desirably, the novel process can be accomplished without opening the reactor or exposing the hydrocarbon contents of the reactor to explosive or flammable conditions, and without increasing catalyst coke formation and solids buildup. Advantageously, the novel process provides better and more accurate catalyst inventory determination and minimizes downtime and frequency of repair.

To this end, the novel process comprises contracting a catalyst bed from an expanded level to a settled level in an ebullated (expanded) bed reactor and substantially maintaining the pressure in the reactor. The height of the contracted settled catalyst bed is then determined in the absence of opening the reactor while preventing air from entering the reactor under flammable conditions which might otherwise cause an explosion of the hydrocarbons in the reactor.

In the preferred process, the catalyst bed is contracted upon draining the feed oil (resid) in the reactor and, thereafter, filling the reactor with oil while the bed remains at its settled level. Preferably, the oil is filled in the reactor at a generally uniform flow rate so that the filling oil rises faster in the bed than above the bed.

Preferably, the oil being fed into the reactor (filling oil) is sensed at the top portion of the contracted catalyst bed and at least two locations above the contracted settled bed. Such sensing can include monitoring the time it takes for the filling oil to rise to the top portion of the contracted catalyst bed and the other two locations.

The oil being fed into the reactor (filling oil) can be different than the oil being drained from the reactor. In one embodiment, the filling oil comprises gas oil. In another embodiment, the filling oil comprises light diesel oil. The oil being drained from the reactor comprises resid.

In the preferred process, the density of the contents of the reactors above the contracted settled catalyst bed is monitored by a set of density detectors which are operatively connected to a central processing unit.

A more detailed explanation of the process is provided in the following description and appended claims, taken in conjunction with the accompanying drawings.

BRIEF DESCRIPTION OF THE DRAWINGS

FIG. 2 is a perspective view of resid hydrotreating units and associated refinery equipment;

FIG. 3 is a schematic flow diagram of a hydrotreating process;

FIG. 4 is a diagram and plot of the feed rate, differential pressure, and densities taken during catalyst inventory determination;

FIG. 5 is a perspective view of the target of the density detector and its associated controller mounted on the outer wall of the reactor; and FIG. 6 is a perspective view of a density detector comprising a Gamma ray source and a target.

DETAILED DESCRIPTION OF THE PREFERRED EMBODIMENT

Figure 1:
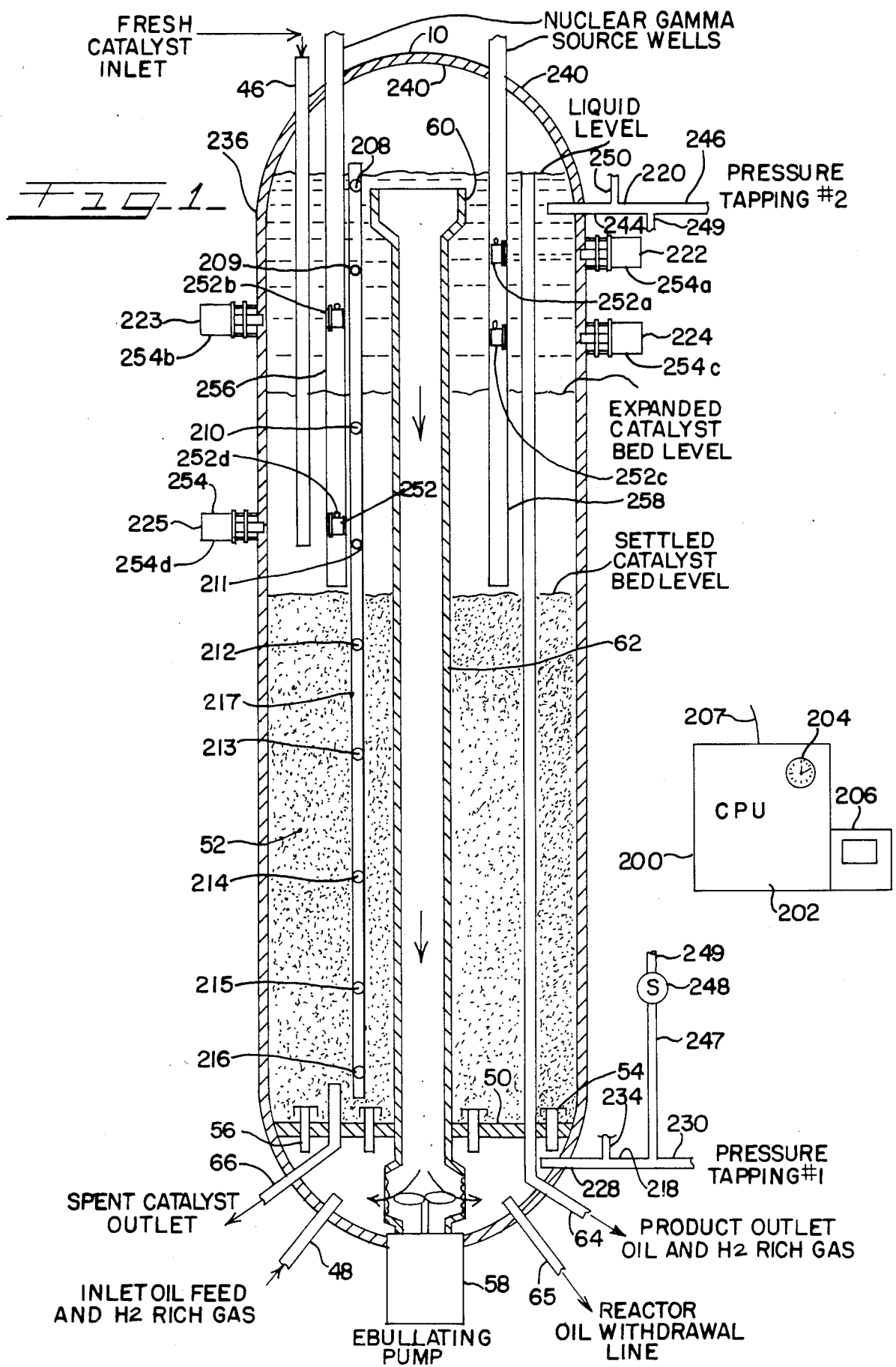
FIG. 1 is a cross-sectional view of an ebullated bed reactor for carrying out the process in accordance with principles of the present invention.

High-sulfur resid oil feed, also referred to as sour crude or vacuum-reduced crude, comprising 1,000+° F. resid and heavy gas oil, is fed into resid hydrotreating units (RHU) 7, 8, and 9 (FIG. 2) along with a hydrogen-rich feed gas. Each resid hydrotreating unit is a reactor train comprising a cascaded series or set of three ebullated (expanded) bed reactors 10, 12, and 14. In the reactors, the resid is hydroprocessed (hydrotreated) in the presence of fresh and/or equilibrium hydrotreating catalyst and hydrogen to produce an upgraded effluent product stream with reactor tail gases (effluent off gases), leaving used spent catalyst. Hydroprocessing in the RHU includes demetalation, desulfurization, denitrogenation, resid conversion, oxygen removal (deoxygenation), and removal of Rams carbon.

The resid hydrotreating units and associated refining equipment (FIG. 2) comprise three identical parallel trains of cascaded ebullated bed reactors 10, 12, and 14, as well as hydrogen heaters 16, influent oil heaters 18, an atmospheric tower 20, a vacuum tower 22, a vacuum tower oil heater 24, a hydrogen compression area 26, oil preheater exchangers 28, separators 30, recycled gas compressors 32, air coolers 36, raw oil surge drums 38, sponge oil flash drums 40, amine absorbers and recycle gas suction drums 42, and sponge oil absorbers and separators 44.

Each of the reactor trains comprises three ebullated bed reactors in series. The oil feed typically comprises resid oil (resid) and heavy gas oil. The feed gas comprises upgraded recycle gases and fresh makeup gases. Demetalation primarily occurs in the first ebullated bed reactor in each train. Desulfurization occurs throughout the ebullated bed reactors in each train. The effluent product stream typically comprises light hydrocarbon gases, hydrotreated naphtha, distillates, light and heavy gas oil, and unconverted hydrotreated resid. The hydrotreating catalyst typically comprises a hydrogenating component on a porous refractory, inorganic oxide support.

The resid hydrotreating unit is quite flexible and, if desired, the same catalyst can be fed to one or more of the reactors or a separate demetalation catalyst can be fed to the first reactor while a different catalyst can be fed to the second and/or third reactors. Alternatively, different catalysts can be fed to some of the reactors, if desired. The used spent catalyst typically contains nickel, sulfur, vanadium, and carbon (coke). Many tons of catalyst are transported into, out of, and replaced in the ebullated bed reactors daily.

As shown in FIG. 1, fresh hydrotreating catalyst is fed downwardly into the top of the first ebullated bed reactor 10 through the fresh catalyst feed line 46. Hot resid feed and hydrogen-containing feed gases enter the bottom of the first ebullated bed reactor 10 through feed line 48 and flow upwardly through a distributor plate or grid 50 into the catalyst bed 52. The distributor plate or grid 50 contains numerous bubble caps 54 and risers 56 which help distribute the oil and the gas across the reactor and prevent the catalyst from falling into the bottom section of the reactor. An ebullating pump 58 circulates oil from a recycle pan 60 through a downcomer 62 and the distributor plate 50. The rate is sufficient to lift and expand the catalyst bed from its initial settled level to its steady state expanded level. The effluent product stream of partially hydrotreated oil and hydrogen-rich reactor tail gases (off gases) is withdrawn from the reactor through effluent product line 64. The used spent catalyst is withdrawn from the bottom of the reactor through spent catalyst discharge line 66. The spent catalyst typically contains deposits of metals, such as nickel and vanadium, which have been removed from the influent feed oil (resid) during hydrotreating.

Catalyst particles are suspended in a three-phase mixture of catalyst, oil, and hydrogen-rich feed gas in the reaction zone of the reactor. Hydrogen-rich feed gas typically continually bubbles through the oil. The random ebullating motion of the catalyst particles results in a turbulent mixture of the phases which promotes good contact mixing and minimizes temperature gradients.

The cascading of the ebullated bed reactors in a series of three per reactor train, in which the effluent of one reactor serves as the feed to the next reactor, greatly improves the catalytic performance of the backmixed ebullated bed process. Increasing the catalyst replacement rate increases the average catalyst activity.

As shown in FIG. 3, the partially hydrotreated effluent in the outlet line 64 of the first ebullated bed reactor 10 comprises the influent feed of the second ebullated bed reactor 12. The partially hydrotreated effluent in the outlet line 68 of the second ebullated bed reactor 12 is the influent feed of the third ebullated bed reactor 14. The second and third reactors are functionally, operatively, and structurally similar to the first reactor and cooperate with the first reactor to effectively hydrotreat and upgrade the influent feed oil. Quench liquid (oil) and/or hydrogen-containing gas can be injected into the influent feeds of the second and third reactors through quench lines 70, 72, 74 and 76 to cool and control the bulk temperatures in the second and third reactors. Fresh catalyst can be fed into the top of all the reactors, although for process efficiency and economy it is preferred to utilize catalyst staging by feeding fresh catalyst into the first and third reactors through fresh catalyst feed lines 46 and 78 and by feeding recycled spent catalyst from the third reactor into the second reactor through recycle catalyst lines 80 and 82. Used spent catalyst is discharged from the reactor through spent catalyst discharge lines 66 and 84.

Preferably, the resid feed, which may contain some heavy gas oil, is heated in the oil heater 18, and the hydrogen-containing feed gas is heated in the hydrogen heater 16 before being combined and fed through the feed line 48 into the first reactor for process efficiency.

The fluid state of the ebullated hydrotreating catalyst enhances the flexibility of the ebullated bed reactors and permits the addition or withdrawal of oil/catalyst slurry without taking the reactors offstream. Daily catalyst replacement results in a steady state equilibrium catalyst activity.

The ebullated bed reactors are capable of handling atmospheric and vacuum resids from a wide range of sour and/or heavy crudes. Such crudes can have a gravity as low as 5° API, a sulfur content up to 8% by weight, and substantial amounts of nickel and vanadium. The ebullated bed reactors typically operate at a temperature above 700° F. and at a hydrogen partial pressure greater than 1500 psi.

Ebullated bed reactors have many advantages over fixed bed reactors. They permit operation at higher average temperatures. They permit the addition and withdrawal of catalyst without necessitating shutdown. They avoid plugging due to dirty feed and formation of solids during resid conversion.

Since the liquid resid feed does not usually have enough velocity to expand the catalyst bed above its settled level, liquid is recycled from the top of the reactor to the bottom of the reactor through a downcomer pipe and then pumped back up through the reactor at a sufficient velocity to attain the required degree of expansion.

Products are withdrawn from the third reactor 14 and are separated into fractions of oil and gas in the towers and other downstream processing equipment. The products produced from the resid hydrotreating units in the ebullated bed reactors include light hydrocarbon gases, light naphtha, intermediate naphtha, heavy naphtha, light distillate, mid-distillate, light gas oil, vacuum naphtha, light vacuum gas oil, heavy vacuum gas oil, and hydrotreated vacuum resid. Light and intermediate naphthas can be sent to a vapor recovery unit for use as gasoline blending stocks and reformer feed. Heavy naphtha can be sent to the reformer to produce gasoline. The mid-distillate oil is useful for producing diesel fuel and furnace oil, as well as for conveying and/or cooling the spent catalyst. Light and heavy vacuum gas oils and light gas oil are useful as feedstock for a catalytic cracker. The vacuum resid can be sent to cokers to produce coke or mixed with a lighter diluent to produce a low sulfur fuel oil.

As shown in FIG. 3, a relatively high sulfur resid oil feed is conveyed by a resid feed line 85 to a common oil feed line 86. A gas oil feed can be conveyed by a gas oil feed line 87 to the common oil feed line 86. The resid and oil feeds are pumped through the common oil feed line 86 into a raw oil surge drum 88 and outwardly through a surge drum-discharge line 89 by an oil pump 90. The raw oil surge drum controls the raw oil feed inventory into the reactors and minimizes surges in the feed rate and feed composition. The oil pump 90 helps regulate the feed rate of the resid and gas oil feeds into the reactor. The resid and gas oil feeds are pumped through pump outlet line 91 through a heat exchanger 92 where the resid and gas oil feeds are preheated. The preheated resid and gas oil feeds are conveyed through a preheated feed line 93 to an oil heater or furnace 18 where it is heated to a temperature ranging from about 650° F. to 750° F. The heated resid and gas oil feedstocks are passed through a heated influent feed line 94 to a common oil gas feed line 48.

Hydrogen-rich feed gases in the feed gas line 95 are fed into a hydrogen heater, feed gas heater or furnace 16 where it is heated to a temperature ranging from about 650° F. to about 900° F. The feed gases are a mixture of upgraded, methane-lean tail gases (effluent off gases) and hydrogen-rich, fresh makeup gases comprising at least about 95% by volume hydrogen and preferably at least about 96% by volume hydrogen. The feed gases comprise a substantial amount of hydrogen, a lesser amount of methane, and small amounts of ethane. The heated feed gases are conveyed through the heated feed gas line 96 to the gas oil feed line 48 where it is conveyed along with the heated resid oil to the first ebullated bed reactor 10.

An orifice plate unit 97 (FIG. 3) can be connected to the pump outlet line 91 to measure the flow rate of the oil feed into the reactor.

Fresh hydrotreating catalyst is fed into the first ebullated bed reactor 10 through the fresh catalyst line 46. Spent catalyst is withdrawn from the first reactor through the spent catalyst line 66. In the first reactor, the resid oil is hydroprocessed (hydrotreated), ebullated, contacted, and mixed with the hydrogen-rich feed gas in the presence of the hydrotreating catalyst at a temperature of about 700° F. to about 850° F., at a pressure of about 2650 psia to about 3050 psia, and at a hydrogen partial pressure of about 1800 psia to about 2300 psia to produce a hydrotreated (hydroprocessed), upgraded, effluent product stream. The product stream is discharged from the first reactor through the first reactor discharge line 64 and conveyed through the second reactor feed line 98 (FIG. 3) into the second ebullated bed reactor 12. A liquid quench can be injected into the product feed entering the second reactor through a liquid quench line 72. The liquid quench can be sponge oil. A gas quench can be injected into the product feed before it enters the second reactor through a gas quench line 70. The gas quench preferably comprises a mixture of upgraded, methane-lean tail gases (effluent off gases) and fresh makeup gases.

Hydrotreating catalyst, which may be removed from the third reactor 14 (FIG. 3), is fed into the second reactor 12 through an influent catalyst line 82. Used spent catalyst is withdrawn from the second reactor through the second spent catalyst line 84. In the second reactor 12, the effluent resid oil product is hydroprocessed, hydrotreated, ebullated, contacted, and mixed with the hydrogen-rich feed gases and quench gases in the presence of the hydrotreating catalyst at a temperature of about 700° F. to about 850° F., at a pressure from about 2600 psia to about 3000 psia and at a hydrogen partial pressure of about 1700 psia to about 2100 psia to produce an upgraded effluent product stream. The product stream is discharged from the second reactor through a second reactor discharge line 68.

The product feed is then fed into the third ebullated bed reactor 14 (FIG. 3) through a third reactor feed line 100. A liquid quench can be injected into the third reactor feed through an inlet liquid quench line 76. The liquid quench can be sponge oil. A gas quench can be injected into the third reactor feed through an input gas quench line 74. The gas quench can comprise upgraded, methane-lean tail gases and fresh makeup gases. Fresh hydrotreating catalyst is fed into the third reactor through a fresh catalyst line 78. Used spent catalyst is withdrawn from the third reactor through the third reactor spent catalyst line 80. In the third reactor, the resid feed is hydroprocessed, hydrotreated, ebullated, contacted, and mixed with the hydrogen-rich gases and quench gases in the presence of the hydrotreating catalyst at a temperature from about 700° F. to about 850° F., at a pressure of about 2550 psia to about 2950 psia and at a hydrogen partial pressure from about 1600 psia to about 2000 psia to produce an upgraded product stream. The product stream is withdrawn from the third reactor 14 through the third reactor discharge line 102 and fed into a high-temperature, high-pressure separator 104 via inlet line 106. A gas quench can be injected into the product stream in the inlet line through a gas quench line 108 before the product stream enters the high-temperature separator. The gas quench can comprise upgraded, methane-lean tail gases and fresh makeup gases.

In the high-temperature (HT) separator 104, the hydrotreated product stream is separated into a bottom stream of high-temperature, hydrotreated, heavy resid oil liquid and an overhead stream of gases and hydrotreated oil vapors. The high-temperature separator is operated at a temperature of about 700° F. to about 850° F. and at a pressure from about 2500 psia to about 2900 psia. The overhead stream of gases and oil vapors are withdrawn from the high-temperature separator through an overhead vapor line 110 and cooled in a resid feed heat exchanger 92 which concurrently preheats the resid oil feed and gas oil feed in line 91 before the resid and gas oil feeds enter the oil heater 18. The cooled vapors and gases exit the heat exchanger 92 and are passed through an intermediate line 112 to downstream processing equipment.

The bottom stream of high-temperature heavy oil liquid is discharged from the bottom of the high-temperature separator 104 (FIG. 3) through a high-temperature separator bottom line 114 and fed to a high-temperature flash drum, the atmospheric tower 20, the vacuum tower 22, and other downstream processing equipment.

As shown in FIG. 1, a central processing unit (CPU) 200 comprising a computer 202 with an internal clock 204 and a plotter printer 206 are mounted in a control room of the oil refinery. The central processing unit 200 is operatively connected by electric wires and cables 207 to thermocouples 208-216 or other temperature sensing devices, as well as to lower pressure tap 218 (pressure tapping #1), upper pressure tap 220 (upper pressure tapping #2), and density detectors 222-225.

The thermocouples 208-216 (FIG. 1) are mounted in three vertical thermowells spaced 120 degrees apart from each other, such as in thermowell 217, between the wall of the reactor and the downcomer 62 at generally uniform intervals above the grid 50 to a position near the top of the reactor vessel. The thermocouples monitor the temperature in the reactors at various heights.

The lower pressure tapping 218 (FIG. 1) extends into the reactor at a position below the grid 50. The lower pressure tapping comprises a lower open pipe 228, which extends inwardly into the reactor below the grid 50, an outwardly extending, lower pipe 230, and a lower purge line 234 which communicates with the inwardly extending open pipe 228. The purge line 234 comprises a lower injector which injects (purges) gases into the inwardly extended open pipe 228 to prevent the open inwardly extending pipe 228 from becoming blocked.

The upper pressure tapping 220 (FIG. 1) extends into the reactor in proximity to the liquid level and the upper tangent line 236 of the reactor at the base of the dome or roof comprising the top 240 of the reactor. The upper pressure tapping 220 can be positioned above or below the liquid level. The upper pressure tapping 220 comprises an upper open pipe 244, which extends inwardly into the reactor in proximity to the liquid level and the upper tangent 236 of the reactor, an upper outer pipe 246, and an upper purge line 250. The upper purge line 250 communicates with open pipe 244 and comprises an upper injector to inject (purges) gases into the upper inwardly extending, open pipe 244 to prevent the upper inwardly extending open pipe 244 from becoming blocked.

A differential pressure sensor or detector 248 is positioned between and connected to the lower and upper pressure tappings 218 and 220 via lines 247 and 249 to determine the differential pressure (pressure differential) $\Delta P$ or $P_b - P_u$ between the lower and upper pressure tappings. The central processing unit 200 detects the rate of change in the pressure differential at the upper and lower pressure tappings 220 and 218 based upon the sensed differential pressures between the upper and lower pressure tappings in cooperation with clock 204. The central processing unit 200 comprising the computer 202 and plotter printer 206, in cooperation with the clock 204, can also detect substantial changes in the rate of change of the differential pressure. The upper pressure tapping can include a diaphragm connected to a capillary pressure instrument.

The density detectors 222-225 (FIG. 1) include an upper density detector 222, an upper intermediate density detector 223, a lower intermediate density detector 224, and a lower density detector 225. In the preferred embodiment, the upper density detector 222 is mounted 4 feet to 6 feet below the upper tangent line 235 of the reactor. The upper intermediate density detector 223 can be mounted 8 feet below the upper tangent line 236 of the reactor. The lower intermediate density detector 224 can be mounted 9 feet below the upper tangent line 236 of the reactor. The lower density detector 225 is preferably mounted 20 feet below the upper tangent line 236 of the reactor at a location slightly above the top of the settled catalyst bed. The density detectors 222-225 are structurally and functionally similar and serve to detect and sense the density of the material (contents) in the annulus between the downcomer 62 and the internal wall of the reactor.

Each of the density detectors 222-225 (FIG. 1) comprises a gamma ray source or transmitter 252 (FIG. 6) and a gamma ray target or receiver 254 (FIGS. 5 and 6). The gamma ray source 252 and target 254 of each density detector are in horizontal alignment and registration with each other. Gamma ray density detectors are preferred because they penetrate resid and gas oil better than alpha and beta rays.

Extending upwardly through the top 240 (FIG. 1) of the reactor from a location slightly above the top of the settled catalyst bed, are a pair of vertical, nuclear, gamma source wells 256 and 258. The nuclear gamma source wells 256 and 258 are preferably positioned on diametrically opposite sides of the downcomer 62. Mounted in the left, vertical, nuclear gamma source well 256 are the upper intermediate gamma ray source 252b and the lower gamma ray source 252d. Mounted in the right, vertical, nuclear gamma source well 258 are the upper gamma ray source 252a and lower intermediate gamma ray source 252c.

As shown in FIG. 6, each gamma ray source 254 comprises a cylindrical housing 260 and a generally flat or planar mounting panel 262. The housing contains a gamma ray source, such as cesium 137. An outwardly facing aperture or opening in the housing emits the gamma rays from the cesium source to its associated target 254. Preferably, the rate, strength, and intensity of the source ranges from about 1,000 to about 3,000 millicuries, most preferably about 2,000 millicuries.

As shown in FIG. 1, the gamma ray targets 254 comprise: an upper target 254a which is aligned in registration with the upper gamma ray source 252a, an upper intermediate target 254b which is aligned in registration with the upper intermediate gamma ray source 252b, a lower intermediate target 254c which is aligned in registration with the lower intermediate gamma ray source 252c, and a lower target 254d which is aligned in registration with the lower gamma ray source 252d.

As shown in FIGS. 5 and 6, each gamma ray target 254 has a tubular cylindrical housing 264 which contains a gamma ray-receiving target portion, an inner base plate 266 with a rectangular periphery which is mounted against the outer wall of the reactor by bolts 267, an elongated rectangular mounting plate 268, and a controller, transducer, or converter 272. The gamma ray-receiving portion of the housing 264 is aligned in registration with a central opening 273 of the inner base plate 266 as well as a recessed opening or bore of the reactor, which extends to a location about two inches from the inner surface wall of the reactor. The controller 272 comprises a cylindrical housing 274 and is connected to the elongated plate 268 via controller base plates 276 and 278 and bolts 280 or other fasteners. The controller housing contains a logic board or circuit for transmitting the sensed detections from the target to the central processing unit 200 in the control room.

The density detectors 222–225 measure the bulk density of the reactor contents (mass per unit volume) by passing a beam of radiation through the material to the detectors. As the density increases, the detected radiation decreases. The density detectors convert this decrease in radiation into material density. Density detectors provide gauges or sensors which measure density by using a sodium-iodide scintillation, light-emitting crystal and a photomultiplier tube in the housing 264 of the target 254 to detect gamma ray photons passing through the reactor contents. The following equation gives the relationship between the incident radiation and density:

$$\frac{I}{I_0} = \exp[-\Sigma \, \mu_i \rho_i x_i]$$

where:
I = radiation at detector.
$I_o$ = radiation at source
i = number of component in radiation path.
$\mu_i$ = absorption coefficient of component i.
$\rho_i$ = density of component i.
$x_i$ = thickness of component i.

For most elements, the mass absorption coefficient varies within a narrow range of 0.071 to 0.078 cm²/gm. Hydrogen is an exception, having a coefficient of 0.154. Its coefficient is double the others because of its high ratio of electrons to mass. Since the nuclear source emits 662-KeV gamma rays, most of the gamma-ray interactions are with atomic electrons by the Compton effect.

The cesium 137 source is housed and contained in a ceramic matrix core within the stainless steel housing 260. The cesium 137 source emits both beta rays and gamma rays, but the steel housing 260 permits only the emission of gamma radiation from the cesium 137 source.

In order to determine the catalyst inventory of an ebullated bed reactor, a fresh catalyst bed is formed by feeding fresh hydrotreating catalyst from the fresh catalyst line 46 into the ebullated bed reactor, having an internal reactor radius $R_R$, upon a grid 50 and about a downcomer 62 having an outer downcomer radius $R_D$. Hydrogen-rich gases and an oil feed are fed into the reactor below the grid through the oil gas feed line 48. The oil feed comprises from about 60% to about 100% resid (resid oil) and about 0% to about 40% gas oil. The oil feed and hydrogen-rich gases are passed generally upwardly through the risers 56 and bubble caps 54 into an upper portion of the reactor above the grid 50 to substantially mix the hydrogen-rich gases and oil feed.

The height of the catalyst bed is increased by expanding the catalyst bed from a settled level to an expanded level while raising the level of the oil feed to a level generally above the downcomer 62 and recycle pan 60 by ebullating the oil feed with the ebullating pump 58. The speed (rpm) of the ebullating pump controls the catalyst level and density in the reactor. The oil feed is hydrotreated with the hydrogen-rich gases in the presence of the hydrotreating catalyst at a hydrotreating temperature and pressure to produce hydrotreated oil. The hydrotreated oil is withdrawn from the reactor through product line 64. Spent catalyst is discharged and withdrawn from the reactor through spent catalyst line 66.

In order to most effectively determine the catalyst inventory of the ebullated bed reactor, (1) the composition of the oil feed is changed so that the oil feed comprises from about 80% to about 100% gas oil and (2) the temperature of the reactor is decreased to a temperature below about 650° F. to substantially prevent coking of the reactor while (3) maintaining the hydrotreating pressure of the reactor. The temperature in the first reactor 10 is controlled, raised (heated), or lowered (cooled) by the hydrogen heater 16 and the oil heater 18. The temperature in the second reactor 12 is regulated or lowered (cooled) by gas and oil quench lines 70 and 72. The temperature in the third reactor 14 is regulated and lowered (cooled) by the gas and liquid quench lines 74 and 76.

Concurrently, feeding of the fresh hydrotreating catalyst into the reactor through the fresh catalyst line 46 and discharging of the spent catalyst from the reactor through spent catalyst line 66 is stopped and blocked.

While this occurs, the catalyst bed is contracted and slumped from its expanded level to a settled level by stopping the ebullating pump 58 and ceasing ebullation. Concurrently, the feed oil is drained from the reactor, through the product line 64 or an auxiliary line 65, and feeding of the feed oil into the reactor through feed line 48 is temporarily stopped and blocked.

After the oil feed is drained from the reactor, a feed oil comprising from about 80% to about 100% fill oil, such as gas oil or light, start-up diesel oil, is fed into the reactor through feed line 48 at a substantially uniform feed rate. Gas oil is preferably used as the feed oil when the reactor is cooled to a temperature ranging from above 500° F. to a temperature below 650° F. Light, start-up diesel oil is preferably used as the fill oil when the reactor is cooled to a temperature below 500° F. The fill oil is fed into the reactor until it substantially fills the reactor to a level generally above the top of the recycle pan 60 and downcomer 62. The fill oil rises more rapidly in the settled catalyst bed then in the space above the catalyst bed.

In order to determine the catalyst inventory of the ebulated bed reactor, the differential pressure $\Delta P$ or $P_b - P_u$ between the lower and upper pressure tappings 218 and 220 is sensed by the differential pressure sensor 248. The differential pressure $\Delta P$ or $P_b - P_u$ is continuously sensed when the fill oil is filling the reactor as well as during hydrotreating and draining.

The central processing unit 200 comprising the computer 202 and the plotter printer 206 in cooperation with the clock 204, can detect substantial changes in the density of the contents of the reactor in response to the transmission of the lower density detector 225 at the lower location, position, area, or zone in the reactor in general proximity to, but spaced above, the settled bed when the reactor is being filled with oil.

The central processing unit 200 comprising the computer 202 and the plotter printer 206 in cooperation with the clock 204, can detect a substantial change in the density of the contents of the reactor, in response to the transmission of the upper density detector 222 at an upper location position, area, or zone in the reactor adjacent the upper density detector 222.

The central processing unit 220 comprising the computer 202 and the plotter printer 206 in cooperation with the clock 204, as well as the differential pressure sensor 248 and the density detectors 222 and 225, can detect and plot substantial changes in the differential pressure $P_b - P_u$ or $\Delta P$, as well as when substantial changes in the density at the lower and upper locations at the lower and upper density detectors 225 and 222, respectively, occur.

The central processing unit 200 can determine the velocity comprising the rise rate of the fill oil above the settled catalyst bed based upon the difference in time when substantial changes and density occurs at the upper and lower locations of the density detectors 222 and 225, respectively, in accordance with the following formula:

$$v = \frac{d_u - d_l}{t_u - t_l}$$

wherein
 $v$ = rise rate of the feed oil in the open reactor above the settled catalyst bed $d_u$ = the minimum distance from the top of the reactor to the upper location
$d_l$ = the minimum distance from the top of the reactor to the lower location
$t_u$ = time when a substantial change in the density at the upper location occurs
$t_l$ = time when a substantial change in the density at the lower location occurs The central processing unit 200 can also determine the minimum distance between the top of the settled catalyst bed and (1) either the location of the upper density detector 222, or (2) the location of the lower density detector 225, in accordance with the following formulas:

$$d_p - d_u = v(t_u - t_p)$$

or $$d_p - d_l = v(t_l - t_p)$$

wherein
 $d_p$ = the minimum distance from the top of the reactor to the top of the settled catalyst bed
 $d_p - d_u$ = the minimum distance between the upper location and the top of the settled catalyst bed
 $d_p - d_l$ = the minimum distance between the lower location and the top of the settled catalyst bed
 $t_p$ = time when a substantial change in the rate of change of pressure differential $P_b - P_u$ occurs at the top of the settled catalyst bed The central processing unit 200 can also determine the height $h_s$ of the settled catalyst bed based upon the preceding determinations and the known minimum internal height $h_r$ of the reactor between the grid 50 and the top or upper tangent line 236 of the ebullated bed reactor in accordance with one of the following formulas:

$$h_s = h_r - d_l - (d_p - d_l)$$

$$h_s = h_r - d_u - (d_p - d_u)$$

The central processing unit 200 can determine the volume followed by $V_s$ of the settled catalyst bed in accordance with the following formula:

$$V_s = \pi h_s (R_R - R_D)^2$$

wherein
 $\pi$ = about 3.14159

The central processing unit 200 can determine the equivalent fresh catalyst weight $W_e$ of the settled catalyst bed based upon the volume $V_s$ of the settled catalyst bed and the known, measured, equivalent density $D_s$ of the fresh catalyst in accordance with the following formula:

$$W_e = D_s \times V_s$$

During the inventory determination process, the plotter printer 206 can automatically and readily print a diagram or chart similar to that shown in FIG. 4 to show the changes in: (1) gas oil feed rate or fill rate, (2) differential pressure between the upper and lower pressure tappings, (3) the density at the upper density detector, and (4) the density at the lower density detector.

EXAMPLE 1

During extensive testing at the Amoco Oil Company Refinery at Texas City, Texas, catalyst inventory in the reactors were determined with a high degree of accuracy without opening the reactors and exposing the hydrocarbon contents of the reactors to air and explosive or flammable conditions. The equipment, hydrotreating and inventory measuring process, and plot diagrams by the plotter printer were similar to that shown in the drawings and described previously. The upper gamma ray density detector was positioned 4 feet below the upper tangent line of the reactor. In one test, the oil feed was fed to the reactor at a constant flow rate of 14.9 MBPD. The differential pressure between the upper and lower pressure tappings varied from 0 psi at the beginning of the test to 26.4 psi at the end of the test. The density at the lower density detector, positioned 20 feet below the upper tangent line, was less than 10 lbs/cf at the beginning of the test to 58.7 lbs/cf at the end of the test. The density at the upper density detector positioned 4 feet below the upper tangent of the reactor was less than 10 lbs/cf at the beginning of the test to 56.2 lbs/cf at the end of the test. Diesel oil was used as the fill oil. The fill oil was fed into the reactor at 1:37 p.m. The rate of change of differential pressure between the upper and lower pressure tappings changed significantly at 1:55 p.m. The density at the lower density detector changed significantly at 2:45 p m. The density at the upper density detector changed significantly at 3:06 p.m. The equivalent fresh catalyst density was 39 lbs/cf. The height of the settled catalyst bed was determined to be 55.3 ft. The catalyst inventory measurement method of this application was found to be as accurate as the plumb bob method but a lot faster and safer.

EXAMPLE 2

A catalyst inventory determination test was conducted in a manner similar to Example 1 except that the density detectors were located at 6, 8, 9, and 20 ft., respectively, below the upper tangent line of the reactor. Densities of 20–23 lbs/cf indicated the presence of gas and oil and the substantial absence of catalyst. A density of 45–55 lbs/cf indicated the presence of gas, oil, and catalyst. When there was not enough catalyst present at the lower intermediate density detector, the speed of the ebullating pump was increased to increase the height of ebullated catalyst bed. When catalyst appeared at the upper intermediate density detector and the upper density detector, the speed of the pump was retarded (slowed down) to decrease the ebullated catalyst bed height.

Among the many advantages of the catalyst inventory measurement determination of the novel process are:
1. Superior catalyst inventory determination in ebullated bed reactors.
2. Excellent accuracy.
3. Greater safety during inventory measurement.
4. Lower operating and maintenance cost.
5. Reduced down time.
6. Minimization of fires and explosions during inventory measurements.
7. Enhanced resid conversion.
8. Improved process effectiveness.
9. Greater process efficiency.

Although embodiments of this invention have been shown and described, it is to be understood that various modifications and substitutions, as well as rearrangements and combinations of process steps and equipment, can be made by those skilled in the art without departing from the novel spirit and scope of this invention.

What is claimed is:

1. A process for determining the catalyst inventory of an ebullated bed reactor, comprising the steps of:
   contracting a catalyst bed from an expanded level to a settled level in an ebullated bed reactor;
   draining the reactor oil in said reactor;
   substantially filling said reactor with filling oil after said catalyst bed has been contracted and said reactor oil drained from said reactor, while substantially maintaining said contracted catalyst bed at its settled level;
   sensing the rate of change of differential pressure between an upper and lower portion of said reactor;
   monitoring the density of the contents of the reactor above said contracted settled catalyst bed;
   sensing the presence of said filling oil at the top portion of said contracted catalyst bed and at least two locations above said contracted settled bed;
   determining the differential pressure when said fill oil is filling said reactor;
   detecting a substantial change in density of the contents of the reactor at a lower location in said reactor in general proximity to but spaced above said settled bed when said reactor is being filled with said oil;
   detecting a substantial change in the density of the contents of the reactor at an upper location in said reactor at a known distance above said lower location when said reactor is being filled with said fill oil;
   timing when substantial changes in the rate of change of differential pressure occur;
   timing when substantial changes in the density at the lower location occurs;
   timing when substantial changes in the density of the upper lower occur;
   determining the velocity comprising the rise rate of the fill oil above said settled catalyst bed based upon the difference in time when substantial changes in density occur at the upper and lower locations;
   determining the minimum distance the top of the settled catalyst bed and one of said locations
   based on said determined velocity and determined times when substantial changes in the density occur in said lower and said upper locations;
   determining the height of the settled catalyst bed based upon said determined minimum distance and the known minimum internal height of the reactor between said grid and said top of said ebullated bed reactor.

2. A process in accordance with claim 1 wherein said filling oil is fed into said reactor at a generally uniform flow rate and said filling oil rises faster in said bed than above said bed; and
   said filling oil filling said reactor is substantially different than said reactor oil drained from said reactor.

3. A process in accordance with claim 1 wherein said filling oil comprises gas oil.

4. A process in accordance with claim 1 wherein said filling oil comprises light diesel oil.

5. A process in accordance with claim 1 wherein said oil being drained from said reactor comprises resid.

6. A process for determining the catalyst inventory of an ebullated bed reactor, comprising the steps of:
  forming a catalyst bed by hydrotreating catalyst into an ebullated bed reactor having internal radius $R_R$ upon a grid comprising a tray and bubble caps and about a downcomer having an outer radius $R_D$;
  injecting hydrogen-rich gases into said reactor;
  feeding an oil feed comprising from about 60% to about 100% resid and about 0% to about 40% gas oil into said reactor at a location spaced below said grid;
  passing said oil feed and said hydrogen-rich gases generally upwardly through said bubble caps into an upper portion of said reactor above said grid to substantially mix said hydrogen-rich gases and oil feed;
  increasing the height of said catalyst bed by expanding said catalyst bed from a settled level to an expanded level while raising the level of said oil feed to a level generally above said downcomer by ebullating said oil feed with an ebullating pump;
  hydrotreating said oil feed with said hydrogen-rich gases in the presence of said hydrotreating catalyst at a hydrotreating temperature and pressure to produce hydrotreated oil;
  withdrawing said hydrotreated oil from said reactor;
  discharging spent catalyst from said reactor;
  changing the composition of said oil feed so that said oil feed comprises from about 80% to about 100% gas oil;
  decreasing the temperature of said reactor to a temperature below about 650° F.;
  substantially maintaining the hydrotreating pressure of said reactor;
  substantially blocking and stopping the feeding of said fresh hydrotreating catalyst into said reactor;
  substantially stopping the discharging of spent catalyst from said reactor;
  contracting said catalyst bed to a settled level by substantially ceasing said ebullation;
  substantially draining said oil feed from said reactor while temporarily stopping the feeding of said feed oil into said reactor; thereafter
  feeding feed oil comprising from about 80% to about 100% fill oil selected from the group consisting of gas oil and diesel oil into said reactor at a substantially uniform feed rate to substantially fill said reactor with said fill oil to a level generally above the top of said downcomer, said fill oil rising more rapidly in said settled catalyst bed then above said catalyst bed;
  sensing the differential pressure $P_b - P_u$ between a location in said reactor below said grid and a location in proximity to the top of said reactor;
  determining the differential pressure $P_b - P_u$ when said fill oil is filling said reactor;
  detecting a substantial change in density of the contents of the reactor at a lower location in said reactor in general proximity to but spaced above said settled bed when said reactor is being filled with said oil;
  detecting a substantial change in the density of the contents of the reactor at an upper location in said reactor at a known distance above said lower location when said reactor is being filled with said fill oil;
  timing when substantial changes in the rate of change of differential pressure $P_b - P_u$ occur;
  timing when substantial changes in the density at the lower location occurs;
  timing when substantial changes in the density of the upper location occur;
  determining the velocity comprising the rise rate of the fill oil above said settled catalyst bed based upon the difference in time when substantial changes in density occur at the upper and lower locations in accordance with the formula $$v = \frac{d_u - d_1}{t_u - t_1}$$

wherein
  $v$ = rise rate of the feed oil in the open reactor above the settled catalyst bed
  $d_u$ = the minimum distance from the top of the reactor to the upper location
  $d_l$ = the minimum distance from the top of the reactor to the lower location
  $t_u$ = time when a substantial change in the density at the upper location occurs
  $t_l$ = time when a substantial change in the density at the lower location occurs
  determining the minimum distance between the top of the settled catalyst bed and one of said locations in accordance with the following formula $$d_p - d_u = v(t_u - t_p)$$

or $$d_p - d_1 = v(t_l - t_p)$$

wherein
  $d_p$ = the minimum distance from the top of the reactor to the top of the settled catalyst bed
  $d_p - d_u$ = the minimum distance between the upper location and the top of the settled catalyst bed
  $d_p - d_1$ = the minimum distance between the lower location and the top of the settled catalyst bed
  $t_p$ = time when a substantial change in the rate of change of pressure differential $P_b - P_u$ occurs at the top of the settled catalyst bed
  determining the height $h_s$ of the settled catalyst bed based upon the preceding determinations and the known minimum internal height $h_r$ of the reactor between said grid and said top of said ebullated bed reactor in accordance with one of the following formulas $$h_s = h_r - d_l - (d_p - d_l)$$

$$h_s = h_r - d_u - (d_p - d_u)$$

7. A process in accordance with claim 6 including determining the volume $V_s$ of the settled catalyst bed in accordance with the formula:

$$V_s = \pi(R_R - R_D)^2$$

wherein
  $\pi$ = about 3.14159

8. A process in accordance with claim 7 including determining the equivalent fresh catalyst weight $W_e$ of the settled catalyst bed based upon said volume and the known or measured equivalent fresh catalyst density $D_s$ of said catalyst in said reactor in accordance with the following formula:

$$W_e = D_s \times V_s$$

9. A process in accordance with claim 6 wherein said detecting of said changes in densities at said locations includes:
  radiating and emitting gamma rays from a gamma ray source;
  penetrating said gamma rays through said contents of the reactor; and
  receiving said gamma rays at target comprising a gamma ray detector.

10. A process in accordance with claim 9 wherein said gamma ray source comprises cesium.

11. A process in accordance with claim 10 wherein said gamma rays are emitted at a rate of about 1000 to about 3000 millicuries.

12. A process in accordance with claim 6 wherein the temperature of said reactor is monitored with thermocouples.

13. A process in accordance with claim 12 including minimizing coking of said reactor by maintaining said temperature below 650° F. during said sensing, detecting, timing, and determinations.

14. A process in accordance with claim 13 wherein said determinations are computed automatically by a central processing unit comprising a computer operatively connected to said ebullated bed reactor and said timing is determined remotely by an internal clock in said computer.

* * * * *

UNITED STATES PATENT OFFICE
CERTIFICATE OF CORRECTION

Patent No. 4,750,989             Dated June 14, 1988

Inventor(s)         DAVID J. SODERBERG

It is certified that error appears in the above-identified patent and that said Letters Patent are hereby corrected as shown below:

| Col. | Line | |
|---|---|---|
| 11 | 20 | "then" should be -- than -- |
| 11 | 23 | "ebulated" should be -- ebullated -- |
| 14 | 44 | "lower" should be -- location -- |
| 15 | 54 | "then" should be -- than -- |

Signed and Sealed this

First Day of November, 1988

Attest:

DONALD J. QUIGG

Attesting Officer

Commissioner of Patents and Trademarks